United States Patent
Matsumoto et al.

(10) Patent No.: US 12,339,048 B2
(45) Date of Patent: Jun. 24, 2025

(54) REFRIGERATION CYCLE APPARATUS

(71) Applicant: Carrier Japan Corporation, Tokyo (JP)

(72) Inventors: Hiroaki Matsumoto, Fuji (JP); Toshiyuki Morimoto, Fuji (JP); Yasuharu Hayasaka, Fuji (JP)

(73) Assignee: Carrier Japan Corporation, Tokyo (JP)

( * ) Notice: Subject to any disclaimer, the term of this patent is extended or adjusted under 35 U.S.C. 154(b) by 125 days.

(21) Appl. No.: 17/942,034

(22) Filed: Sep. 9, 2022

(65) Prior Publication Data

US 2023/0003430 A1    Jan. 5, 2023

Related U.S. Application Data

(63) Continuation of application No. PCT/JP2020/010956, filed on Mar. 12, 2020.

(51) Int. Cl.
 *F25B 13/00*  (2006.01)
 *F25B 31/02*  (2006.01)
 *F25B 49/02*  (2006.01)

(52) U.S. Cl.
 CPC .......... *F25B 49/025* (2013.01); *F25B 13/00* (2013.01); *F25B 31/026* (2013.01)

(58) Field of Classification Search
 CPC ....... F25B 49/025; F25B 13/00; F25B 31/026
 See application file for complete search history.

(56) References Cited

U.S. PATENT DOCUMENTS

2019/0249912 A1\* 8/2019 Yamada ................. F25B 49/02

FOREIGN PATENT DOCUMENTS

| JP | 4906836 B | 3/2012 |
| JP | WO2019/021448 A1 | 1/2019 |
| JP | 2019062726 A | 4/2019 |
| JP | 2019176554 A | 10/2019 |
| JP | 2019198152 A \* | 11/2019 |

OTHER PUBLICATIONS

Kamiya, Motor driving device, 2018, Full Document (Year: 2018).\*
The PCT Search Report and Written Opinion mailed on Apr. 21, 2020, for PCT Application No. PCT/JP2020/010956, 15 pages.

\* cited by examiner

*Primary Examiner* — Nael N Babaa
(74) *Attorney, Agent, or Firm* — Lee & Hayes, P.C.

(57) ABSTRACT

According to one embodiment, a refrigeration cycle apparatus includes a motor which including a plurality of phase windings in a mutually unconnected state, a first inverter which controls application of electric power to one ends of the phase windings, a second inverter which controls application of electric power to the other ends of the phase windings, switches connected between the other ends of the phase windings, and a motor controller which selectively sets one of an open-windings mode and a star-connection mode. The motor controller sets, at the time of startup of the motor, the open-windings mode.

11 Claims, 6 Drawing Sheets

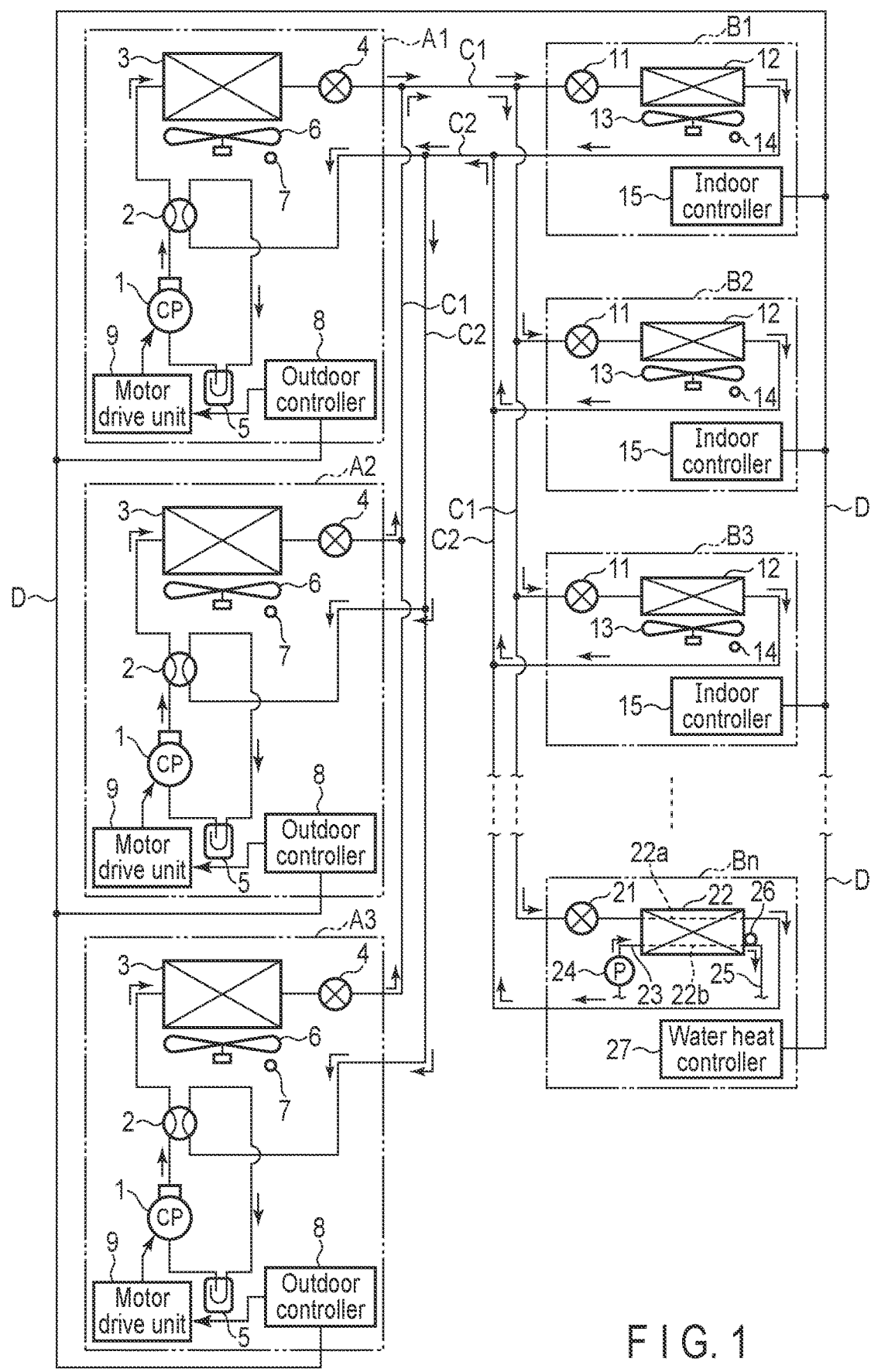
F I G. 1

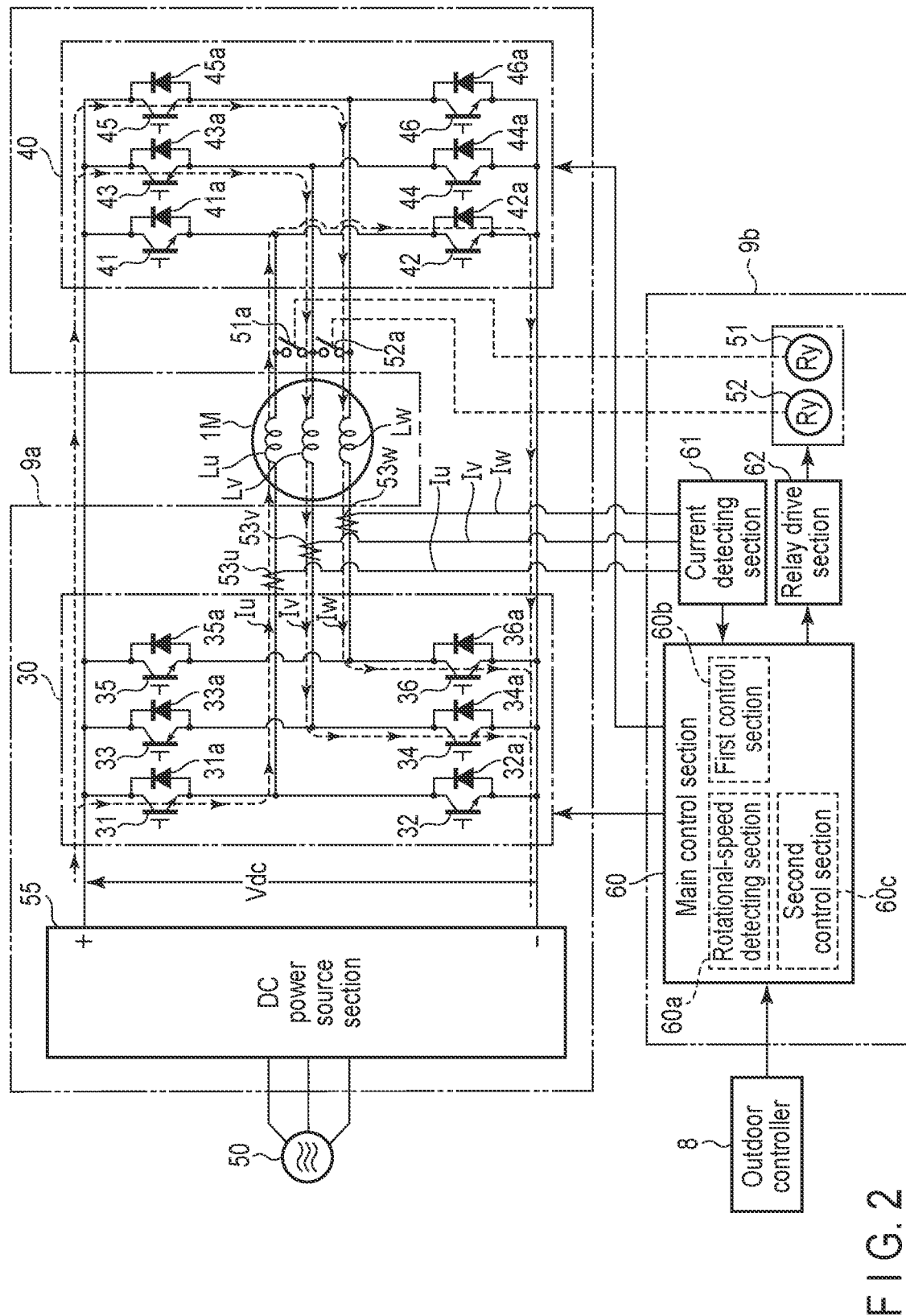
F I G. 2

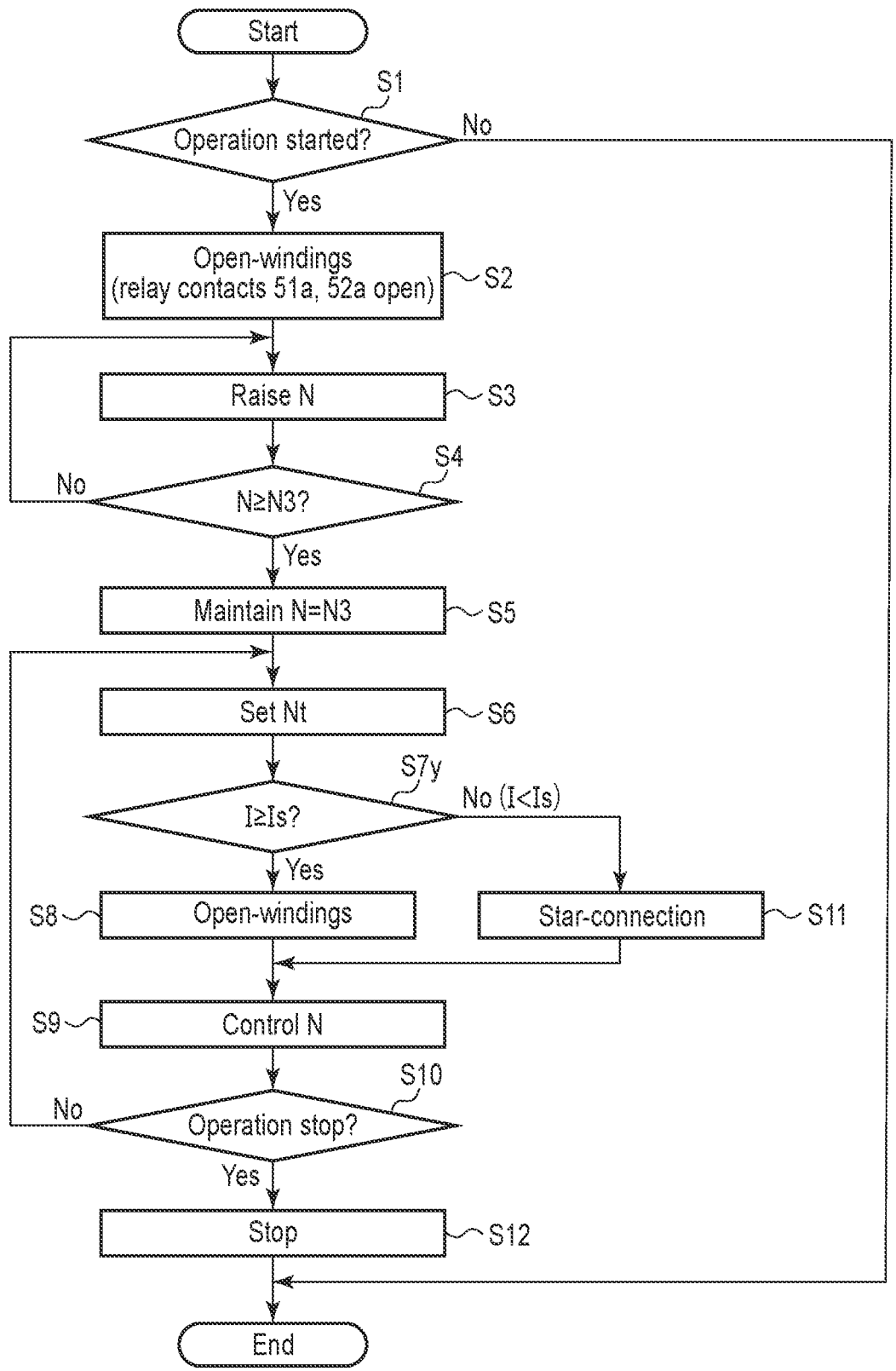
F I G. 6

REFRIGERATION CYCLE APPARATUS

CROSS-REFERENCE TO RELATED APPLICATIONS

This application is a Continuation application of PCT Application No. PCT/JP2020/010556, filed Mar. 12, 2020, the entire contents of which are incorporated herein by reference.

FIELD

Embodiments described herein relate generally to a refrigeration cycle apparatus including a motor having a plurality of phase windings in a mutually unconnected state as a drive motor of a compressor.

BACKGROUND

As a drive motor of a compressor to be mounted on a refrigeration cycle apparatus such as an air conditioner or the like, a permanent magnet synchronous motor including a plurality of phase windings is used. Further, as an example of the permanent magnet synchronous motor (referred to also as a DC brushless motor), an open-windings motor configured in such a manner that a plurality of phase windings are placed in a mutually unconnected state is known.

The refrigeration cycle apparatus including the open-windings motor (abbreviated as a motor) further includes a first inserter configured to control application of electric power to one end of each phase winding of the motor, second inverter configured to control application of electric power to the other end of each phase winding of the motor, and switches connected between the other ends of the phase windings and, in the apparatus, a star-connection mode in which the phase windings are connected to each other to form a star connection (referred to also as an star-shaped connection) by closing of the switches, whereby switching of the first inverter is separately carried out, and open-windings mode in which the phase windings are brought into an unconnected state by opening of the switches, whereby switching operations of the first and second inverters are carried out in coordination with each other are selectively set.

In the open-windings mode, it is possible to apply approximately twice the voltage at the time of the star-connection mode to each phase winding. In consideration of this point, in the refrigeration cycle apparatus, in the low-rotational-speed range (referred to also as a low-and-middle rotational speed range) in which the rotational speed of the motor is less than a threshold, the switches are closed, whereby the star-connection mode is set and separate switching of the first inverter is controlled in such a manner that the rotational speed of the motor becomes the target rotational speed corresponding to the load. In the high-rotational-speed range in which the rotational speed of the motor is greater than or equal to the threshold, the switches are opened, whereby the open-windings mode is set and coordinated switching of the first and second inserters is controlled in such a manner that the rotational speed of the motor becomes the target rotational speed corresponding to the load. By switching between the star-connection mode and open-windings mode during an operation of the motor without stopping the motor, it is possible to carry out a highly efficient operation within a wide rotational-speed range from the low-rotational-speed range to the high-rotational-speed range.

Switches such as relays or the like used to switch between the star-connection mode and open-windings mode each have a lifetime corresponding to the number of times of operations. This lifetime becomes shorter with an increase in the number of times of switching between the star-connection mode and open-windings mode. Further, when switching between the star-connection mode and open-windings mode is carried out during an operation of the motor, it is also necessary to switch between the separate switching of the first inverter and coordinated switching of the first and second inverters at appropriate timing and, depending on the load variation of the motor or power-source state, there is a possibility of an unstable state occurring at the time of the changeover, and hence it is hopefully desirable that the number of times of switching between the star-connection mode and open-windings mode be smaller.

Embodiments described herein aim to provide a refrigeration cycle apparatus capable of reducing the number of times of operations of a switch to the extent possible and, thereby capable of realizing improvement in the lifetime of the switches and carrying out stable motor drive.

BRIEF DESCRIPTION OF THE DRAWINGS

FIG. 1 is a block diagram showing the configuration of an air conditioner according to each embodiment.

FIG. 2 is a block diagram showing the configuration of each embodiment.

FIG. 6 is a flowchart showing control of a motor controller in a third embodiment.

DETAILED DESCRIPTION

Figure 3:
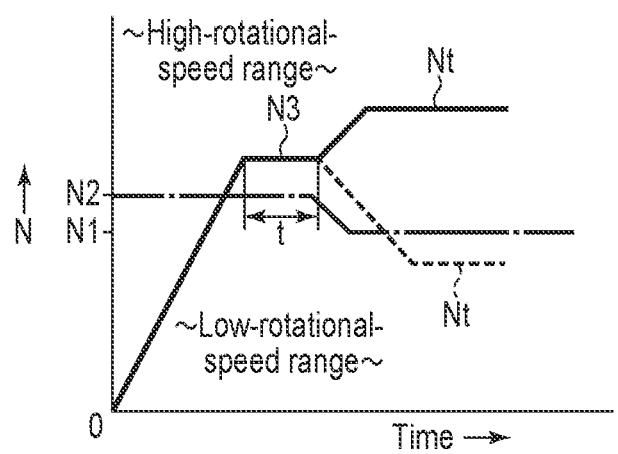
FIG. 3 is a view showing variations in the rotational speed at the time of startup of the motor, and mode-selection condition in the normal operation of the motor in a first embodiment.

In general, according to one embodiment, a refrigeration cycle apparatus of claim 1 comprising: a refrigeration cycle in which compressor, condenser, pressure reducer, and evaporator are connected to each other, whereby a refrigerant is circulated through the refrigeration cycle; a motor which includes a plurality of phase windings in a mutually unconnected state and drives the compressor; a first inverter which controls application of electric power to one ends of the phase windings; a second inverter which controls application of electric power to the other ends of the phase windings; switches connected between the other ends of the phase windings; and a motor controller which selectively sets one of an open-windings mode in which the other ends of the phase windings are placed in an unconnected state by opening of the switches, and switching operations of the first and the second inverters are carried out in coordination with each other, and a star-connection mode in which the other ends of the phase windings are connected to each other by closing of the switches, and thereby switching of the first inverter is carried out. The motor controller sets, at the time of startup of the motor, the open-windings mode.

[1] First Embodiment

The configuration of a refrigeration cycle apparatus of a first embodiment will be described below with reference to the accompanying drawings. In this embodiment, although descriptions will be given by taking a so-called multi-type air conditioner in which a plurality of outdoor units and a plurality of indoor units are connected in parallel with each other as an example, the refrigeration cycle apparatus is not limited to this, and may be a heat pump type chiller unit, refrigerator, and the like.

As shown in FIG. 1, a plurality of outdoor units (first, second, and third outdoor units) A1 to A3 are connected in parallel with each other by refrigerant pipes, and a plurality of indoor units B1 to Bn are connected to the outdoor units A1 to A3 in a state where the units B1 to Bn are in parallel with each other through liquid-side pipes C1 and gas-side pipes C2. Further, between each of the outdoor units A1 to A3 and each of the indoor units B1 to Bn, signal lines D for data transmission and control are connected. By the connection between the outdoor units A1 to A3 and indoor units B1 to Bn, a multi-type air conditioner apparatus configured to carry out cooling and heating and carry out supply of cold/hot water for air conditioning is constituted. In the refrigeration cycle, the outdoor unit A1 functions as a parent unit for overall control, and remaining outdoor units A2 and A3, and indoor units B1 to Bn function as child units operating according to instructions from the parent unit.

Each of the outdoor units A1 to A3 includes a compressor 1, four-way valve 2, outdoor heat exchanger 3, expansion valve (pressure reducer) 4, accumulator 5, outdoor fan 6, outdoor temperature sensor 7, outdoor controller 8, and motor drive unit 9 of this embodiment. At the time of a cooling operation, as indicated by solid arrows, the gaseous refrigerant flowing from the indoor units B1 to Bn into the gas-side pipe C2 is sucked into each compressor 1 through each four-way valve 2 and accumulator 5, gaseous refrigerant compressed by each compressor 1 and discharged therefrom flows into each outdoor heat exchanger 3 through each tour-way valve 2, and refrigerant condensed in each outdoor heat exchanger by heat exchange with the outdoor air flows into the indoor units B1 to Bn through each expansion valve 4 and liquid-side pipe C1. At the time of a heating operation, the liquid refrigerant flowing from the indoor units B1 to Bn into the liquid-side pipe C1 flows into each outdoor heat exchanger 3 through each expansion valve 4, refrigerant evaporated in each outdoor heat exchanger 3 by heat exchange with the outdoor air is sucked into each compressor 1 through each four-way valve 2 and accumulator 5, and gaseous refrigerant compressed in each compressor 1 and discharged therefrom flows into the indoor units B1 to Bn through the four-way valve 2 and gas-side pipe C2.

Each of the indoor units B1, B2, . . . includes a flow regulating valve 11, indoor heat exchanger 12, indoor fan 13, indoor temperature sensor 14, and indoor controller 15. At the time of a cooling operation, as indicated by the solid arrows, the liquid refrigerant flowing from the outdoor units A1 to A3 into the liquid-side pipe C1 flows into each indoor heat exchanger 12 through each flow regulating valve 11, and refrigerant evaporated in each indoor heat exchanger 12 by heat exchange with the indoor air flows into the outdoor units A1 to A3 through the gas-side pipe C2. At the time of a heating operation, the gaseous refrigerant flowing from the outdoor units A1 to A3 into the gas-side pipe C2 flows into each indoor heat exchanger 12, and refrigerant condensed in each indoor heat exchanger 12 by heat exchange with the indoor air flows into the outdoor units A1 to A3 through the liquid-side pipe C1. The flow regulating valve 11 is a pulse-motor valve (PMV) in which the degree of opening (aperture) is continuously changed from the fully closed position to the fully opened position according to the number of drive voltage pulses to be supplied thereto. The indoor fan 13 sucks the indoor air therein and sends the air to the indoor heat exchanger 12. The indoor temperature sensor 14 is arranged in the flow path of the indoor air sucked by the indoor fan 13 and senses the temperature Ta of the indoor air. The indoor controller 15 detects a difference ΔTa between the sensed temperature Ta of the indoor temperature sensor 14 and preset indoor temperature Ts as the air-conditioning load, controls the degree of opening (aperture) of the flow regulating valve 11 according to the air-conditioning load ΔTa, and notifies the outdoor controller 8 of the outdoor unit (parent unit) A1 of the air-conditioning load ΔTa by the signal line D. That is, at the time of a cooling operation, the outdoor heat exchanger 3 functions as a condenser, and indoor heat exchanger 12 functions as an evaporator. At the time of a heating operation, the outdoor heat exchanger 3 functions as an evaporator, and indoor heat exchanger 12 functions as a condenser.

The indoor unit Bn includes a flow regulating valve 21, water heat exchanger 22, water pipe 23, pump 24, water pipe 25, water temperature sensor 26, and water heat controller 27. The flow regulating valve 21 is a pulse-motor valve (PMV) in which the degree of opening (aperture) is continuously changed from the fully closed position to the fully opened position according to the number of drive voltage pulses to be supplied thereto. In the water heat exchanger 22, heat exchange between the refrigerant flowing through a refrigerant flow path 22a and water flowing through a water flow path 22b is carried out. An inflow port of the water flow path 22b is connected to a water outflow port of, for example, a heat radiator or boiler which is a load through a water pipe 23 and pump 24 arranged on the water pipe 23. An outflow port of the water flow path 21b is connected to a water inflow port of the aforementioned heat radiator or boiler through the water pipe 25. By the operation of the pump 24, water of the heat radiator or boiler is circulated through the water pipe 23, water flow path 22b, and water pipe 25. A temperature Tw of the water flowing outwardly from the water flow path 22b is sensed by the water temperature sensor 26. At the time of cold water supply operation, as indicated by solid arrows, the liquid refrigerant flowing from the outdoor units A1 to A3 into the liquid-side pipe C1 flows into the refrigerant flow path 22a of the water heat exchanger 22 through the flow regulating valve 21, refrigerant evaporated in the refrigerant flow path 22a by heat exchange with the water of the water flow path 22b flows into the outdoor units A1 to A3 through the gas-side pipe C2. At the time of hot water supply operation, the gaseous refrigerant flowing from the outdoor units A1 to A3 into the gas-side pipe C2 flows through the refrigerant flow path 22a of the water heat exchanger 22, and refrigerant condensed in the refrigerant flow path 22a by heat exchange with the water of the water flow path 22b flows into the outdoor units A1 to A3 through the flow regulating valve 21 and liquid-side pipe C1. The water heat controller 27 detects a difference ΔTw between the sensed temperature Tw of the water temperature sensor. 26 and preset water set temperature Tws as a water temperature load, controls the degree of opening (aperture) of the flow regulating valve 21 according to the water temperature load ΔTw, and notifies the outdoor controller 8 of the outdoor unit (parent unit) A1 of the water temperature load ΔTw by the signal line D.

The outdoor controller 8 of the outdoor unit A1 perceives the total load of the air-conditioning loads ΔTa notified from the indoor units B1 to Bn and water temperature load ΔTw as the load of the air conditioner (refrigeration cycle apparatus) concerned, allocates the capability corresponding to the load to the outdoor units A1 to A3 in a proportionally dividing manner, recognizes the allocated portions of the capability by the outdoor controller 8 of the outdoor unit A1 itself, and notifies the outdoor controllers 8 of the outdoor units A2 and A3 of the allocated portions of the capability.

The compressor 1 of each of the outdoor units A1 to A3 is an encapsulated type compressor in which the motor 1M shown in FIG. 2 is accommodated in a hermetically sealed case as the drive motor together with a compressing portion. The motor 1M is a permanent magnet synchronous motor and is a so-called open-windings motor having a plurality of phase windings Lu, Lv, and Lw in a mutually unconnected state. The phase windings Lu, Lv, and Lw are each configured by winding a thin copper wire in a large number of turns at a high density in order that the efficiency can be improved in the low-rotational-speed range (referred to also as the low-and-medium rotational speed range). However, when such phase windings of a high density and large number of turns are used, a voltage to be induced in each of the phase windings Lu, Lv, and Lw with an increase in the rotational speed of the motor 1M rises at an early stage, a difference between the induced voltage and voltage to be supplied from the inverter to be described later to each of the phase windings Lu, Lv, and Lw becomes smaller at the early stage, and it becomes impossible to further increase the rotational speed of the motor 1M. Thus, the motor controller 9b to be described later sets, in the low-rotational-speed range, the star-connection mode in which the phase windings Lu, Lv, and Lw are connected to each other to form a star connection (referred to also as a star-shaped connection) and switching of only the inverter 30 to be described later is separately carried out and sets, in the high-rotational-speed range, the open-windings mode in which the phase windings are placed in an unconnected state (opened state), and switching operations of the inverter 30 and inverter 40 to be described later are carried out in coordination (referred to also as cooperation) with each other. By the setting described above, it is possible to carry out a highly efficient operation within a wide rotational speed range up to the high-rotational-speed range while making it possible to carry out a highly efficient operation in the low-rotational-speed range.

The motor drive unit 9 of each of the outdoor units A1 to A3 includes a drive circuit 9a and motor controller 9b shown in FIG. 2. The motor drive circuit 9a includes a DC power source section 55 configured to subject AC voltages of a three-phase AC power source 50 to full-wave rectification, smooth the rectified voltage, and output the smoothed voltage, inverter (referred to also as a first inverter or master inverter) 30 configured to control energization between the output ends of the GC power source section 55 and one ends of the phase windings Lu, Lv, and Lw of the open-windings motor 1M, and inverter (referred to also as second inverter or slave inverter) 40 configured to control energization between the output ends of the DC power source section 55 and the other ends of the phase windings Lu, Lv, and Lw of the open-windings motor 1M. The power-communalized system in which the DC power source 55 is made the DC power source common to the inverters 30 and 40 is employed.

The inverter 30 includes a U-phase series circuit in which switching elements, e.g., IGBTs 31 and 32 are connected in series, and interconnection point of the IGBTs 31 and 32 is connected to one end of the phase winding Lu of the open-windings motor 1M, V-phase series circuit in which switching elements IGBTs 33 and 34 are connected in series, and interconnection point of the IGBTs 33 and 34 is connected to one end of the phase winding Lv of the open-windings motor 1M, and W-phase series circuit in which switching elements IGBTs 35 and 36 are connected in series, and interconnection point of the IGBTs 35 and 36 is connected to one end of the phase winding Lw of the open-windings motor 1M, and controls application of power from the positive-side output end of the DC power source 55 to one ends of the phase windings Lu, Lv, and Lw and application of power from one ends of the phase windings Lu, Lv, and Lw to the negative side output end of the βC power source 55 by switching of the IGBTs 31 to 36. Each of diodes for regeneration (referred to also as freewheel diodes) 31a to 36a is connected in inverse parallel with each of the IGBTs 31 to 36.

In the inverter 40, a U-phase series circuit in which switching elements IGBTs 41 and 42 are connected in series, and interconnection point of the IGBTs 41 and 42 is connected to the other end of the phase winding Lu of the open-windings motor 1M, V-phase series circuit in which switching elements IGBTs 43 and 44 are connected in series, and interconnection point of the IGBTs 43 and 44 is connected to the other end of the phase winding Lv of the open-windings motor 1M, and W-phase series circuit in which switching elements IGBTs 45 and 46 are connected in series, and interconnection point of the IGBTs 45 and 46 is connected to the other end of the phase winding Lw of the open-windings motor 1M are connected in parallel with each other, and application of power from the positive-side output end of the DC power source 55 to the other ends of the phase windings Lu, Lv, and Lw and application of power from the other ends of the phase windings Lu, Lv, and Lw to the negative side output end of the DC power source 55 are controlled by switching of the IGBTs 41 to 46. Each of diodes for regeneration (referred to also as freewheel diodes) 41a to 46a is connected in inverse parallel with each of the IGBTs 41 to 46.

It should be rioted that the inverter 30 is actually a module, i.e., a so-called intelligent power module (IPM) in which a main circuit formed by connecting the aforementioned three series circuits of the U phase, V phase, and W phase in parallel with each other, and peripheral circuits such as a drive circuit and the like configured to drive the IGBTs 31 to 36 of the main circuit are accommodated in a single package. In the inverter 40 too, an IPM of the same configuration is used.

Between the other end of the phase winding Lu of the motor 1M and the other end of the phase winding Lv, a normally open contact (referred to as a relay contact) 51a of a switch such as a relay 51 is connected. Between the other end of the phase winding Lv of the motor 1M and the other end of the phase winding Lw, a normally open contact (referred to as a relay contact) 52a of a switch such as a relay 52 is connected. Energization-on and energization-off of the relays 51 and 52 are controlled by the motor controller 9b in synchronization with each other. When the relays 51 and 52 are energized, the relay contacts 51a and 52a are closed, and the other ends of the phase windings Lu, Lv, and Lw are connected to each other, whereby the phase windings Lu, Lv, and Lw enter the star-connection state. When the relays 51 and 52 are de-energized, the relay contacts 51a and 52a are opened, and phase windings Lu, Lv, and Lw enter an unconnected state, i.e., the open-windings state where the phase windings. Lu, Lv, and Lw are electrically separate from each other.

Current sensors 53u, 53v, and 53w are arranged on the three energizing lines between the inverter 30 and one ends of the phase windings Lu, Lv, and Lw, and output signals of these current sensors 53u, 53v, and 53w are sent to the motor controller 9b. The current sensors 53u, 53v, and 53w sense currents (referred to as motor currents) Iu, Iv, and Iw flowing through the phase windings Lu, Lv, and Lw.

The motor controller 9b is a controller configured to control the drive circuit 9a according to an instruction from the outdoor controller 8, and includes a main control section 60 serving as the center of control, current detecting section 61, relay drive section 62, display section 63, relays 51 and 52, and the like. The current detecting section 61 detects a peak value and effective value of each of the motor currents Iu, Iv, and Iw sensed by the current sensors 53u, 53v, and 53w. The relay drive section 62 energizes or de-energizes the relays 51 and 52 according to an instruction from the main control section 60. The main control section 60 is constituted of a microcomputer and peripheral circuits thereof, and controls make/break of the relay contacts 51a and 52a and switching of the inverters 30 and 40 according an instruction from the outdoor controller 8, detection result of the current detecting section 62, and the like.

The main control section 60, in particular, is a section having a function of selectively setting the open-windings mode in which the other ends of the phase windings Lu, Lv, and Lw are brought into an unconnected state by opening of the relay contacts 51a and 52a, and switching operations of the inverters 30 and 40 are carried out in coordination with each other, and star-connection mode in which the other ends of the phase windings Lu, Lv, and Lw are connected to each other by closing of the relay contacts 51a and 52a, and switching of only the inverter 30 is separately carried out, and includes a rotational-speed detecting section 60a, first control section 60b, and second control section 60c as the main configuration relating to the setting of the star-connection mode and open-windings mode.

The rotational-speed detecting section 60a detects (estimates) the rotational speed (number of rotations) N of the motor 1M on the basis of the switching states of the inners 30 and 40 and "instantaneous values of the motor currents Iu, Iv, and Iw" detected by the current detecting section 61.

The first control section 60b sets the open-windings mode at the time of startup of the motor 1M, and controls switching (coordinated switching of the inverters 30 and 40) of the open-windings mode in such a manner that the detected rotational speed N of the rotational-speed detecting section 60a rises to a predetermined rotational speed N3 (for example, 50 rps or 60 rps) in the high-rotational-speed range shown in FIG. 3.

The second control section 60c sets, after the detected rotational speed N of the rotational-speed detecting section 60a is raised to the predetermined rotational speed N3 in the aforementioned high-rotational-speed range by the first control section 60b, a target rotational speed (target speed) Nt on the basis of the allocated capability (load) from the outdoor controller 8, sets, when the target rotational speed Mt is within the high-rotational-speed range, the open-windings mode and controls switching of the open-windings mode in such a manner that the detected rotational speed N of the rotational-speed detecting section 60a reaches the target rotational speed Nt, and sets, when the target rotational speed Nt is within the low-rotational-speed range shown in FIG. 3, the star-connection mode and controls switching (separate switching of the inverter 30) of the star-connection mode in such a manner that the detected rotational speed N of the rotational-speed detecting section 60a reaches the target rotational speed Nt.

FIG. 3 shows variations in the rotational speed N at the time of startup of the motor 1M, and mode-selection condition (first mode selection condition) in the normal operation of the motor 1M. The mode-selection condition is a condition specifying, in the normal operation state of the motor 1M other than the state at the time of startup, selection of one of the open-windings mode and star-connection mode according to the target rotational speed Nt and, in the case of a change of the target rotational speed Nt in the upward direction, when the target rotational speed Nt is within the low-rotational-speed range less than a second threshold N2 (for example, 40 rps), specifies the star-connection mode and, when the target rotational speed Nt is within the high-rotational-speed range greater than or equal to the second threshold N2, specifies the open-windings mode. Furthermore, in the case of a change of the target rotational speed Nt in the downward direction, when the target rotational speed Nt is within the high-rotational-speed range greater than or equal to a first threshold N1 (<N2), the mode selection condition specifies the open-windings mode and, when the target rotational speed Nt is within the low-rotational-speed range less than the first threshold N1, specifies the star-connection mode. By providing a hysteresis width based on the second threshold N2 and first threshold N1 at the boundary between the low-rotational-speed range and high-rotational-speed range, frequent changeovers between the star-connection mode and open-windings mode are prevented from occurring.

It should be noted that a configuration in which mode selection is carried out not only on the basis of the target rotational speed Nt, but also on the basis of the "peak values or effective values of the motor currents Iu, Iv, and Iw" varying according to the magnitude of the load, and further on the basis of the target rotational speed Nt may also be employed.

Figure 4:
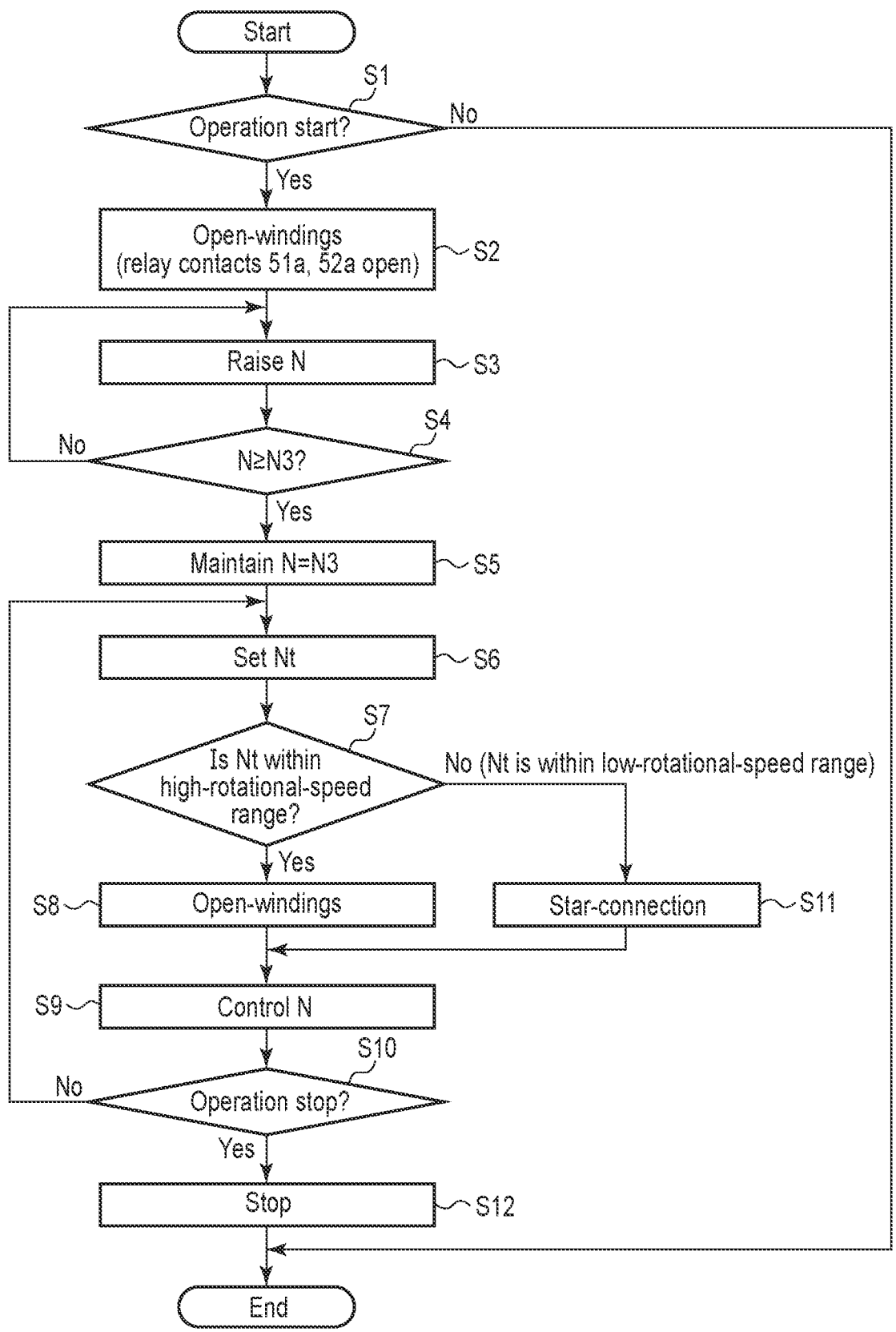
FIG. 4 is a flowchart showing control of a motor controller in the first embodiment.

Next, the control to be executed by the motor controller 9b will be described with, reference to FIG. 3 and FIG. 4. Steps S1, S2, . . . in the flowchart of FIG. 4 will be simply abbreviated as S1, S2, . . . .

[At the Time of Startup of Motor 1M]

Upon receipt of an operation start instruction from the outdoor controller 8 (YES of S1), the motor controller 9b brings the other ends of the phase windings Lu, Lv, and Lw into the unconnected state by opening of the relay contacts 51a and 52a to thereby set the open-windings mode in which switching operations of the inverters 30 and 40 are carried out in coordination with each other (S2). At the time of a stop of the motor 1M, the normally open relay contacts 51a and 52a are in the opened state due to non-energization of the relays 51 and 52 and phase windings Lu, Lv, and Lw are in the mutually unconnected state, and hence it is possible to set the open-windings mode without the need to operate the relay contacts 51a and 52a.

Subsequently, the motor controller. 9b compares the detected rotational speed N of the rotational-speed detecting section 60a and predetermined rotational speed N3 of the high-rotational-speed range with each other (S4) while controlling switching of the open-windings mode in such a manner that the rotational speed N of the motor 1M increases at a rate of, for example, "1 rps/s" (S3). When the detected rotational speed N is less than the predetermined rotational speed N3 (NO of S4), the motor controller 9b returns to aforementioned S4 and continues switching of the open-windings mode (S4).

A part of the current paths to be formed at the time of the open-windings mode is shown by broken lines in FIG. 2. First, the IGBT 31 of the inverter 30 is turned on, then IGBT 42 of the inverter 40 is repetitively turned on and turned off and, at the same time, both IGBTs 43 and 45 of the inverter 40 are turned on, and IGBTs 34 and 36 of the inverter 30 are repetitively turned on and turned off in synchronization with each other. Thereby, as indicated by dashed arrows, a current flows from the positive side output end of the DC power source 55 to the phase winding Lu through the IGBT 31, the current passing through the phase winding Lu flows to the negative side output end of the DC power source 55 through the IGBT 42 then, a the same time currents flow from the positive side output end of the DC power source 55 to the phase windings Lv and Lw through the IGBTs 43 and 45, the currents passing through the phase windings Lv and Lw flow to the negative side output end of the DC power source 55 through the IGBTs 34 and 36. Next, the IGBT 33 of the inverter 30 is turned on, IGBT 44 of the inverter 40 is repetitively turned on and turned off, at the same time, both IGBTs 41 and 45 of the inverter 40 are turned on, and then IGBTs 32 and 36 of the inverter 30 are repetitively turned on and turned off in synchronization with each other. Thereby, a current flows from the positive side output end of the DC power source 55 to the phase winding Lv through the IGBT 33, the current passing through the phase winding Lv flows to the negative side output end of the DC power source 55 through the IGBT 44, at the same time, currents flow from the positive side output end of the DC power source 55 to the phase windings Lu and Lw through the IGBTs 41 and 45, and the currents passing through the phase windings Lu and Lw flow to the negative side output end of the DC power source 55 through the IGBTs 32 and 36. Next, the IGBT 35 of the inverter 30 is turned on, IGBT 46 of the inverter 40 is repetitively turned on and turned off, at the same time, both IGBTs 41 and 43 of the inverter 40 are turned on, and then IGBTs 32 and 34 of the inverter 30 are repetitively turned on and turned off in synchronization with each other. Thereby, a current flows from the positive side output end of the DC power source 55 to the phase winding Lw through the IGBT 35, the current passing through the phase winding Lw flows to the negative side output end of the DC power source 55 through the IGBT 46, at the same time, currents flow from the positive side output end of the DC power source 55 to the phase windings Lu and Lv through the IGBTs 41 and 43, and the currents passing through the phase windings Lu and Lv flow to the negative side output end of the DC power source 55 through the IGBTs 32 and 34. These three patterns of current paths are switched over in sequence, whereby the rotor of the motor 1M is rotated.

By the setting of the open-windings mode, it is possible to apply a voltage about $\sqrt{3}$ times the voltage at the time of the star-connection mode to each of the phase windings Lu, Lv, and Lw, and hence it becomes possible to efficiently raise the rotational speed N of the motor 1M to the high-rotational-speed range corresponding to the high air-conditioning load at the time of startup of the operation. At the time of startup of the air conditioner, in particular, not only the air-conditioning load is high, but also indoor temperature sensing is in the unstable state because the indoor fan 13 has only started to operate and the fresh indoor air does not adequately flow to the indoor temperature sensor 14, and thus it is difficult to appropriately grasp the air-conditioning load. Under such circumstances at the time of startup of the operation, in the case where the open-windings mode in which the relay contacts 51a and 52a are left opened without energizing the relays 51 and 52 is set from the beginning and rotational speed N of the motor 1M is raised to the high-rotational-speed range, it is possible to make the number of times of operations of the relay contacts 51a and 52a surely less by at least once than in the case where the star-connection mode in which the relay contacts 51a and 52a are closed by energizing the relays 51 and 52 is set in the low-rotational-speed range and thereafter the mode is shifted to the open-windings mode in the high-rotational-speed range. That is, it becomes possible to make the air conditioner exert air-conditioning capability sufficient to be able to cope with an unstable high air-conditioning load while holding down the number of times of operations of the relay contacts 51a and 52a to the minimum.

It should be noted that at the time of startup of the operation of the air conditioner, concomitantly with the starting of the compressor 1, part of the lubricating oil inside the compressor 1 flows out into the refrigeration cycle in a state where the oil is mixed with the refrigerant, and the escaping lubricating oil gradually comes to return to the compressor 1 by way of the refrigeration cycle. During the time up to the return of the escaped lubricating oil to the compressor 1, the operation of the refrigeration cycle enters an unstable state such as a state where the lubricating oil inside the compressor 1 slightly tends to be insufficient. Regarding this point, in this embodiment, the rotational speed N of the motor 1M is continuously raised to the predetermined rotational speed N3 of the high-rotational-speed range at the time of starting of the compressor 1 and, even when part of the lubricating oil inside the compressor 1 flows out into the refrigeration cycle, the flowed-out lubricating oil rapidly circulates through the refrigeration cycle to come to return to the compressor 1 earlier, and thus it is possible to stabilize the operation of the refrigeration cycle at the early stage.

[Startup Completion of Motor 1M]

When the detected rotational speed N of the rotational-speed detecting section 60a reaches the predetermined rotational speed N3 of the high-rotational-speed range (YES of S4), the motor controller 9b carries out, on the basis of the determination that the startup of the motor 1M has been completed, switching of the open-windings mode for a predetermined time t in such a manner that the detected rotational speed N of the rotational-speed detecting section 60a maintains the predetermined rotational speed N3 (S5). The predetermined time t is the time from the time when the compressor 1 is started to the time when the operation of the refrigeration cycle becomes stable, e.g., about 30 seconds. It the predetermined time t is excessively long, the difference between the target rotational speed Nt after the elapse of the predetermined time t and actual rotational speed N becomes greater, and the rotational speed N takes an excessively much time to reach the target rotational speed Nt. In order that such a problem may not occur, in general, a time of about 10 to 60 seconds is selected as the predetermined time t.

After the elapse of the predetermined time t, the motor controller 9, sets a target rotational speed Nt commensurate with the allocated capability (load) from the outdoor controller 8 (S6). Then, the motor controller 9b determines whether the aforementioned set target rotational speed Nt is within the high-rotational-speed range or within the low-rotational-speed range (S7).

When the target rotational speed Nt is within the high-rotational-speed range (YES of 37), the motor controller 9b maintains the setting of the open-windings mode (S8), and controls switching of the open-windings mode in such a manner that the detected rotational speed N of the rotational-speed detecting section 60a becomes the target rotational speed Nt (S9). Subsequently, when there is no operation stop instruction from the outdoor controller 8 (NO of S10), the motor controller 9b returns to above-described S6 to set the target rotational speed Nt again (S6).

On the other hand, when the target rotational speed Nt is within the low-rotational-speed range (NO of S7), the motor controller. 9b sets the star-connection mode (S11), and controls switching of the set star-connection mode in such a manner that the detected rotational speed N of the rotational-speed detecting section 60a becomes the target rotational speed Nt (S9). Changes in the rotational speed N of this case are indicated by the broken line in FIG. 3. It should be noted that in setting of the star-connection mode in above-described S11, when the operation of the motor 1M during the preceding time is carried out in the open-windings mode, timing at which no potential difference occurs between the relay contacts 51a and 52a is created by controlling the switching patterns of the inverters 30 and 40, the relay contacts 51a and 52a are closed by energizing the relays 51 and 52 at the aforementioned timing, and switching of the inverter 40 is stopped in this state and the mode is shifted to the star-connection mode in which switching of only the inverter 30 is carried out. Thereby, the operation of the motor 1M is continued without stopping.

On the other hand, in setting of the star-connection mode in above-described S11, when the operation of the motor 1M during the preceding time is carried out in the star-connection mode, the operation of the motor 1M based on the star-connection mode is continued as it is.

Further, when the target rotational speed Nt enters the high-rotational-speed range during the operation of the motor 1M based on the star-connection mode (YES of S7), the motor controller. 9b sets the open-windings mode in place of the star-connection mode (S8). At this time, switching of the inverter 40 is started, timing at which no potential difference occurs between the relay contacts 51a and 52 is created by controlling the switching patterns of the inverters 30 and 40, and the relay contacts 51a and 52a are opened by de-energizing the relays 51 and 52 at the aforementioned timing. Thereby, it is possible to continue the operation of the motor 1M without stopping.

Subsequently, when there is no operation stop instruction from the outdoor controller 8 (NO of S10), the motor controller 9b returns to aforementioned S6 to set a target rotational speed Nt commensurate with the allocated capability from the outdoor controller 8 again (S6). Thereafter, the motor controller 13 repeats the same control as above.

When there is an operation stop instruction from the outdoor controller 8 (YES of S10), the motor controller 13 de-energizes the relays 51 and 52 to open the relay contacts 51a and 52a and stops the inverters 30 and 40 (S12).

CONCLUSION

As described above, at the time of startup of the motor 1M, by setting the open-windings mode in which the relay contacts 51a and 52a are left opened without energizing the relays 51 and 52 from the beginning to raise the rotational speed N of the motor 1M, it is possible to hold down the number of times of operations of the relay contacts 51a and 52a and number of times of changeovers between the open-windings mode and star-connection mode as small as possible. Thus, the number of times of operations of the relay contacts 51a and 52a becomes smaller, and hence it is possible to realize an improvement in the Lifetime of the relays 51 and 52 and stable operation.

[2] Second Embodiment

An example in which control of a second control section 60c in the motor controller 9b and mode selection condition are different from the first embodiment will be described below as a second embodiment.

The second control section 60c sets, after the motor 1M is started by switching of the open-windings mode carried out by the first control section 60b and detected rotational speed N of the rotational-speed detecting section 60a is raised to the predetermined rotational speed N3, a target rotational speed Nt on the basis of the allocated capability (load) from the outdoor controller 3, thereafter when the detected rotational speed N of the rotational-speed detecting section 60a is within the high-rotational-speed range of the second mode selection condition to be described later, sets the open-windings mode, controls switching of the open-windings mode in such a manner that the detected rotational speed N becomes the target rotational speed Nt and, when the detected rotational speed N is within the low-rotational-speed range of the second mode selection condition, sets the star-connection mode and controls switching of the open-windings mode in such a manner that the detected rotational speed N becomes the target rotational speed Nt.

The second mode selection condition is a condition for specifying selection of one of the open-windings mode and star-connection mode according to the actual rotational speed (detected rotational speed of the rotational-speed detecting section 60a) of the motor LM and, at the time of a change in the detected rotational speed N of the rotational-speed detecting section 60a in the upward direction, while the detected rotational speed N is within the low-rotational-speed range Less than the second threshold N2, specifies the star-connection mode and, while the detected rotational speed N is within the high-rotational-speed range greater than or equal to the second threshold N2, specifies the open-windings mode. Furthermore, at the time of a change in the detected rotational speed N in the downward direction, while the detected rotational speed N is within the high-rotational-speed range greater than or equal to the first threshold N1 (<N2), the second mode selection condition specifies the open-windings mode and, while the detected rotational speed N is within the low-rotational-speed range less than the first threshold N1, specifies the star-connection mode.

During the actual operation of the motor 1M, although there is a possibility of a certain time delay occurring, the rotational speed N rapidly shifts to the target rotational speed Nt, and hence there is no substantial difference between the control of specifying selection of the mode according to the rotational speed N as in the case of this second embodiment and control of specifying selection of the mode according to the target rotational speed Nt as in the case of the first embodiment. It should be noted that a configuration in which the mode is selected not on the basis of only the rotational speed N, but on the basis of "peak values or effective values of the motor currents Iu, Iv, and Iw" varying according to the magnitude of the load, and rotational speed N may also be employed.

Figure 5:
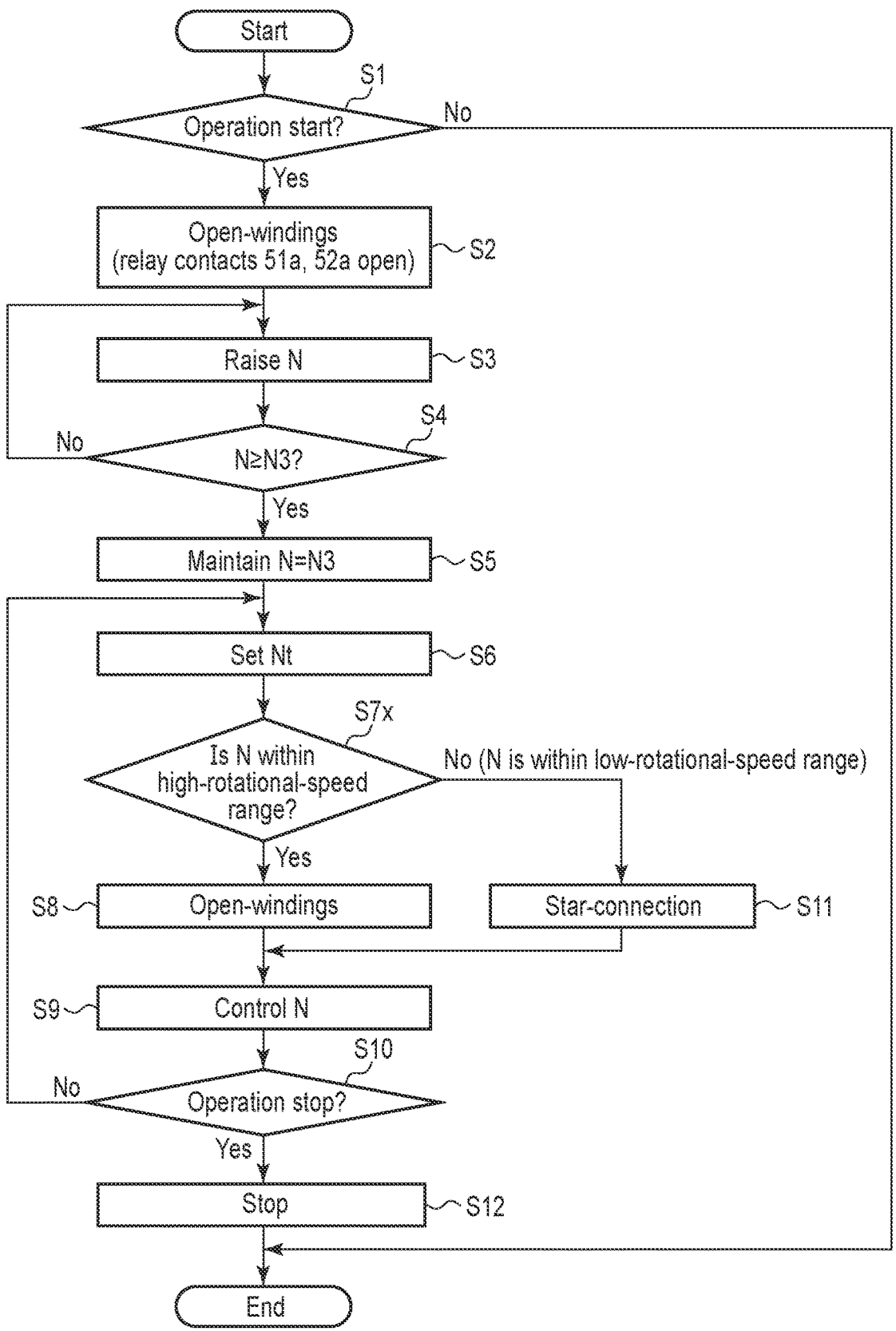
FIG. 5 is a flowchart showing control of a motor controller in a second embodiment.

The control to be executed by the motor controller 9b is shown in the flowchart of FIG. 5. In this control, in place of the processing of S7 of FIG. 4 of determining whether the target rotational speed Nt is within the high-rotational-speed range or within the low-rotational-speed range, the motor controller 9b executes the processing of S7x of determining whether the rotational speed (detected rotational speed of the rotational-speed detecting section 60a) N of the motor 1M is within the high-rotational-speed range or within the low-rotational-speed range.

That is, after setting the target rotational speed Nt in aforementioned S6 concomitantly with the startup completion of the motor 1M, the motor controller 9b determines whether the detected rotational speed N of the rotational-speed detecting section 60a is within the high-rotational-speed range or within the low-rotational-speed range (S7x). When the detected rotational speed N is within the high-rotational-speed range (YES of S7x), the motor controller 9b sets the open-windings mode (S8), and controls switching of the open-windings mode in such a manner that the detected rotational speed N becomes the target rotational speed Nt (S9). When the detected rotational speed N is within the low-rotational-speed range (NO of S7x), the motor controller 9b sets the star-connection mode (S11), and controls switching of the star-connection mode in such a manner that the detected rotational speed N becomes the target rotational speed Nt (S9).

The other configurations, control, and effect of the second embodiment are identical to the first embodiment, and hence descriptions of the above are omitted.

[3] Third Embodiment

A third embodiment in which attention is paid to the fact that the peak values and effective values of the motor currents Iu, Iv, and Iw are proportionate to the magnitude of the load and rotational speed N of the motor 1M will be described below. Each of the peak values or effective values of the motor currents Iu, Iv, and Iw is hereinafter referred to as a detected current T. of the current detecting section 61.

The second control section 60c sets, after the startup of the motor 1M is completed by switching of the open-windings mode carried out by the first control section 60b and detected rotational speed N of the rotational-speed detecting section 60a is raised to the predetermined rotational speed N3, a target rotational speed Nt commensurate with the allocated capability from the outdoor controller 8, when the detected current I of the current detecting section 61 is greater than or equal to the set value Is, sets the open-windings mode on the basis of the determination that the rotational speed N is within the high-rotational-speed range of the above-described second mode selection condition, controls switching of the open-windings mode in such a manner that the detected rotational speed N of the rotational-speed detecting section 60a becomes the target rotational speed Nt and, when the detected current I of the current detecting section 61 is less than the set value Is, sets the star-connection mode on the basis of the determination that the rotational speed N is within the low-rotational-speed range of the above-described second mode selection condition, and controls switching of the open-windings mode in such a manner that the detected rotational speed N of the rotational speed detecting section 60a becomes the target rotational speed Nt.

The control to be executed by the motor controller 96 is shown in the flowchart of FIG. 6. In this control, in place of the processing of S7x of FIG. 5 of determining whether the rotational speed N is within the high-rotational-speed range or within the low-rotational-speed range, the motor controller 9b executes the processing of S7y of determining whether or not the detected current I of the current detecting section 61 is greater than or equal to the set value Is.

That is, after setting the target rotational speed Nt in above-described S6 concomitantly with the startup completion of the motor 1M, the motor controller 9b determines whether the detected current I of the current detecting section 61 is greater than or equal to the set value Is or less than the set value Is (S7y). When the detected current I is greater than or equal to the set value Is (YES of S7y), the motor controller 9b sets the open-windings mode (S8), and controls switching of the open-windings mode in such a manner that the detected rotational speed N of the rotational-speed detecting section 60a becomes the target rotational speed Nt (S9). When the detected current I is less than the set value is (NO of S7y), the motor controller 9b sets the star-connection mode (S11), and controls switching of the star-connection mode in such a manner that the detected rotational speed N becomes the target rotational speed Nt (S9).

It should be noted that in the determination of the set value Is of above-described S7y, specifically, two set values Is2 and Is1 for creating a hysteresis width are selectively used. When replaced with the rotational speed N, the set value Is2 is a value corresponding to the threshold N2 of the mode selection condition of FIG. 3, and is used when the detected current I changes in the upward direction. When replaced with the rotational speed N, the set value Is1 (<Is2) is a value corresponding to the threshold N1 of the mode selection condition of FIG. 3, and is used when the detected current changes in the downward direction.

The other configurations, control, effect are identical to the first and second embodiments, and hence descriptions of the above are omitted.

[4] Modified Example

Although in the embodiments described above, descriptions are given by taking the case where the normally open relay contacts 51a and 52a are used as switches as an example, semiconductor switches may also be used as the switches.

During a normal operation after the startup of the motor 1M is completed, as the determination processing for selecting one of the open-windings mode and star-connection mode, the determination processing of S7 of the first embodiment, determination processing of S7x of the second embodiment, and determination processing S7y of the third embodiment may appropriately be combined with each other. For example, when the determination processing of S7x of the second embodiment and determination processing S7y of the third embodiment are combined with each other, the motor controller 9b executes, when the detected rotational speed N enters the high-rotational-speed range from the low-rotational-speed range (YES of S7x) or when the detected current I enters the range greater than or equal to the set value Is from the range less than the set value Is (YES of S7y), a changeover from the star-connection mode to the open-windings mode and, when the detected rotational speed N shifts to the low-rotation-speed range from the high-rotational-speed range (NO of S7x) and detected current I shifts to the range less than the set value Is from the range greater than or equal to the set value Is (NO of S7y), executes a changeover from the open-windings mode to the star-connection mode.

Although in the embodiments described above, the power-communalized system in which the inverters 30 and 40 are connected to the same DC power source 55 is employed, the embodiments can also be implemented in the same manner in the power-isolated system in which the inverters 30 and 40 are connected to DC power sources separate from each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A refrigeration cycle apparatus comprising:
a refrigeration cycle in which a compressor, a condenser, a pressure reducer, and an evaporator are connected to each other, whereby a refrigerant is circulated through the refrigeration cycle;
a motor which includes a plurality of phase windings in a mutually unconnected state and drives the compressor;
a first inverter which controls application of electric power to one ends of the phase windings;
a second inverter which controls application of electric power to the other ends of the phase windings;
switches connected between the other ends of the phase windings; and
a motor controller which selectively sets one of an open-windings mode in which the other ends of the phase windings are placed in an unconnected state by opening of the switches, and switching operations of the first and the second inverters are carried out in coordination with each other, and a star-connection mode in which the other ends of the phase windings are connected to each other by closing of the switches, and thereby switching of the first inverter is carried out,
wherein
the motor controller raises, at the time of startup of the motor, a rotational speed of the motor to a predetermined rotational speed by switching of the open-windings mode, thereafter sets, when a target rotational speed to be set on the basis of a load of the refrigeration cycle apparatus is within a high-rotational-speed range greater than or equal to a threshold, the open-windings mode, and sets, when the target rotational speed is within a low-rotational-speed range less than the threshold, the star-connection mode and controls switching of the open-windings mode or the open-windings-star-connection mode in such a manner that the rotational speed of the motor becomes the target rotational speed.

2. The refrigeration cycle apparatus of claim 1, wherein the predetermined rotational speed is within the high-rotational-speed range.

3. The refrigeration cycle apparatus of claim 1, wherein the switches are of a normally open type.

4. The refrigeration cycle apparatus of claim 1, wherein the motor controller can execute a changeover from the open-windings mode to the star-connection mode and a changeover from the star-connection mode to the open-windings mode during an operation of the motor.

5. The refrigeration cycle apparatus of claim 1, wherein the apparatus is an air conditioner including
at least one outdoor unit including the compressor, an outdoor heat exchanger functioning as the evaporator or the condenser, and the pressure reducer, and
a plurality of indoor units each of which includes an indoor heat exchanger functioning as the condenser or the evaporator.

6. A refrigeration cycle apparatus comprising:
a refrigeration cycle in which a compressor, a condenser, a pressure reducer, and an evaporator are connected to each other, whereby a refrigerant is circulated through the refrigeration cycle;
a motor which includes a plurality of phase windings in a mutually unconnected state and drives the compressor;
a first inverter which controls application of electric power to one ends of the phase windings;
a second inverter which controls application of electric power to the other ends of the phase windings;
switches connected between the other ends of the phase windings; and
a motor controller which selectively sets one of an open-windings mode in which the other ends of the phase windings are placed in an unconnected state by opening of the switches, and switching operations of the first and the second inverters are carried out in coordination with each other, and a star-connection mode in which the other ends of the phase windings are connected to each other by closing of the switches, and thereby switching of the first inverter is carried out,
wherein
the motor controller raises, at the time of startup of the motor, a rotational speed of the motor to a predetermined rotational speed by switching of the open-windings mode, thereafter sets, when the rotational speed of the motor is within a high-rotational-speed range greater than or equal to a threshold, the open-windings mode, and sets, when the rotational speed of the motor is within a low-rotational-speed range less than the threshold, the star-connection mode and controls switching of the open-windings mode or the star-connection mode in such a manner that the rotational speed of the motor becomes a target rotational speed to be set on the basis of a load of the refrigeration cycle apparatus.

7. The refrigeration cycle apparatus of claim 6, wherein the predetermined rotational speed is within the high-rotational-speed range.

8. The refrigeration cycle apparatus of claim 6, wherein the motor controller can execute a changeover from the open-windings mode to the star-connection mode and a changeover from the star-connection mode to the open-windings mode during an operation of the motor.

9. The refrigeration cycle apparatus of claim 6, wherein the apparatus is an air conditioner including
at least one outdoor unit including the compressor, an outdoor heat exchanger functioning as the evaporator or the condenser, and the pressure reducer, and
a plurality of indoor units each of which includes an indoor heat exchanger functioning as the condenser or the evaporator.

10. A refrigeration cycle apparatus comprising:
a refrigeration cycle in which a compressor, a condenser, a pressure reducer, and an evaporator are connected to each other, whereby a refrigerant is circulated through the refrigeration cycle;
a motor which includes a plurality of phase windings in a mutually unconnected state and drives the compressor;
a first inverter which controls application of electric power to one ends of the phase windings;
a second inverter which controls application of electric power to the other ends of the phase windings;
switches connected between the other ends of the phase windings;
a motor controller which selectively sets one of an open-windings mode in which the other ends of the phase windings are placed in an unconnected state by opening of the switches, and switching operations of the first and the second inverters are carried out in coordination with each other, and a star-connection mode in which the other ends of the phase windings are connected to each other by closing of the switches, and thereby switching of the first inverter is carried out; and a current sensor which detects currents of the motor, wherein the motor controller raises, at the time of startup of the motor, a rotational speed of the motor to a predetermined rotational speed by switching of the open-windings mode, thereafter sets, when a detected current of the current sensor is greater than or equal to a set value, the open-windings mode, sets, when the detected current of the current sensor is less than the set value, the star-connection mode, and controls switching of the open-windings mode or the star-connection mode in such a manner that the rotational speed of the motor becomes a target rotational speed to be set on the basis of a load of the refrigeration cycle apparatus.

11. The refrigeration cycle apparatus of claim 10, wherein the apparatus is an air conditioner including at least one outdoor unit including the compressor, an outdoor heat exchanger functioning as the evaporator or the condenser, and the pressure reducer, and a plurality of indoor units each of which includes an indoor heat exchanger functioning as the condenser or the evaporator.

* * * * *